US010282266B2

(12) United States Patent
Yang et al.

(10) Patent No.: US 10,282,266 B2
(45) Date of Patent: May 7, 2019

(54) APPARATUS AND SYSTEM FOR TESTING TOUCH SCREEN AND APPARATUS FOR CONTROLLING TEST OF TOUCH SCREEN (71) Applicants: BOE Technology Group Co., Ltd., Beijing (CN); BOE (Hebei) Mobile Display Technology Co., Ltd., Hebei (CN)

(72) Inventors: Guowen Yang, Beijing (CN); Yongjun Liao, Beijing (CN); Zhen Wu, Beijing (CN); Dongnian Han, Beijing (CN); Jiayin Wang, Beijing (CN)

(73) Assignees: BOE TECHNOLOGY GROUP CO., LTD., Beijing (CN); BOE (HEBEI) MOBILE DISPLAY TECHNOLOGY CO., LTD., Hebei (CN)

( * ) Notice: Subject to any disclaimer, the term of this patent is extended or adjusted under 35 U.S.C. 154(b) by 373 days.

(21) Appl. No.: 15/084,873

(22) Filed: Mar. 30, 2016

(65) Prior Publication Data
US 2017/0023637 A1 Jan. 26, 2017

(30) Foreign Application Priority Data
Jul. 22, 2015 (CN) .......................... 2015 1 0435030

(51) Int. Cl.
G06F 11/22 (2006.01)
G06F 3/041 (2006.01)
(Continued)

(52) U.S. Cl.
CPC ............ *G06F 11/263* (2013.01); *G06F 3/041* (2013.01); *G06F 3/0414* (2013.01);
(Continued)

(58) Field of Classification Search
CPC ... G06F 11/2733; G06F 11/277; G06F 11/263
See application file for complete search history.

(56) References Cited

U.S. PATENT DOCUMENTS 6,861,866 B2   3/2005 Han
2012/0044158 A1*  2/2012 Chang .................. G06F 3/0416
                                                        345/173
(Continued)

FOREIGN PATENT DOCUMENTS

CN   101551725 A   10/2009
CN   103164300 A    6/2013
(Continued)

OTHER PUBLICATIONS

First Office Action, including Search Report, for Chinese Patent Application No. 201510435030.X, dated Oct. 9, 2017, 20 pages.

*Primary Examiner* — Paul M. West
(74) *Attorney, Agent, or Firm* — Westman, Champlin & Koehler, P.A.

(57) ABSTRACT

The present disclosure provides an apparatus and system for testing a touch screen, and an apparatus for controlling test of a touch screen. The apparatus for testing a touch screen comprises: a processor, a test signal collection interface unit, and an external communication interface unit, wherein the processor is connected to the test signal collection interface unit, and is configured to, after touch information is collected by the test signal collection interface unit, convert the collected touch information into a format which is recognizable by an intelligent device, and transmit the converted touch information to the intelligent device through the external communication interface unit. The apparatus for testing a touch screen according to the present disclosure enables the touch information to be correspondingly processed and displayed by a processor and a display of the intelligent device, respectively. In this way, as the processor of the apparatus for testing a touch screen per se needs not to perform corresponding data processing and analysis processes, a processor with low performance may be used to (Continued)

facilitate reducing the manufacturing cost of the apparatus for testing a touch screen.

9 Claims, 3 Drawing Sheets

(51) Int. Cl.
    *G06F 11/263*     (2006.01)
    *G06F 11/273*     (2006.01)
    *G06F 11/277*     (2006.01)

(52) U.S. Cl.
    CPC .......... *G06F 3/0416* (2013.01); *G06F 3/0418* (2013.01); *G06F 11/2221* (2013.01); *G06F 11/277* (2013.01); *G06F 11/2733* (2013.01)

(56) References Cited

U.S. PATENT DOCUMENTS

| | | | |
|---|---|---|---|
| 2013/0162548 A1 | 6/2013 | Chen et al. | |
| 2015/0154728 A1* | 6/2015 | Nara | G06F 3/0488 345/157 |
| 2015/0277606 A1* | 10/2015 | Kim | G06F 3/044 345/174 |

FOREIGN PATENT DOCUMENTS

| | | |
|---|---|---|
| CN | 104461801 A | 3/2015 |
| CN | 204288754 U | 4/2015 |
| JP | 3444032 B2 | 6/2003 |
| KR | 10 2004 0009415 A | 1/2004 |

\* cited by examiner

APPARATUS AND SYSTEM FOR TESTING TOUCH SCREEN AND APPARATUS FOR CONTROLLING TEST OF TOUCH SCREEN

CROSS-REFERENCE TO RELATED APPLICATION

This application claims priority to Chinese Patent Application No. 201510435030.X, filed on Jul. 22, 2015, entitled "APPARATUS AND SYSTEM FOR TESTING TOUCH SCREEN AND APPARATUS FOR CONTROLLING TEST OF TOUCH SCREEN," which is incorporated herein by reference in its entirety.

TECHNICAL FIELD

The present disclosure relates to the technical field of display, and more particularly, to an apparatus and system for testing a touch screen and an apparatus for controlling test of a touch screen.

BACKGROUND

Touch screens are sensitive crystal display apparatuses which can receive input signals via contacts, and may be touch screens on mobile terminals such as a mobile phone or Personal Computers (PCs), which are currently the simplest, convenient and natural human-computer interaction mode. Touch screens enable multimedia to be presented with a new look, and are highly attractive new multimedia interactive devices. Touch screens are mainly applied in public information query, office business handling, industrial control, military command, electronic games, song request and dish order, multimedia teaching, real estate pre-sale or the like. In order to make sure that a touch screen functions well, functions of the touch screen must be tested.

In the related art, a common apparatus for testing a touch screen is comprised of a touch information collection interface, a processor and a display. During a test, the touch information collection interface is connected to a touch chip of the touch screen through a test line, and a user performs a lineation test on the touch screen at the same time. The touch chip of the touch screen detects touch information and transmits the touch information to the processor of the apparatus for testing a touch screen for processing. After the processor completes processing, corresponding data is displayed on the display. As a procedure of processing the touch information is complex, a processor with good performance needs to be used, which results in a high cost of the apparatus for testing a touch screen.

SUMMARY OF THE DISCLOSURE

The present disclosure aims to solve the above technical problems.

According to an aspect of the present disclosure, the present disclosure provides an apparatus for testing a touch screen, comprising: a processor, a test signal collection interface unit, and an external communication interface unit, the processor being connected to the test signal collection interface unit and the external communication interface unit, wherein, the test signal collection interface unit is configured to collect touch information of the tested touch screen, and the processor is configured to convert the collected touch information into a format which is recognizable by an intelligent device, and transmit the converted touch information to the intelligent device through the external communication interface unit.

Furthermore, the intelligent device may be an intelligent device external to the tested touch screen or an intelligent device to which the tested touch screen belongs.

Furthermore, the apparatus for testing a touch screen further comprises: a memory, configured to receive and store attribute parameters corresponding to different types of touch screens; wherein the processor is connected to the memory to collect touch information of a touch screen according to attribute parameters of the corresponding type of touch screen stored in the memory.

Furthermore, the apparatus for testing a touch screen further comprises: a display screen, wherein, the processor is further configured to receive touch defect information transmitted by the intelligent device through the external communication interface unit and display the touch defect information on the display screen, wherein the touch defect information is obtained by the intelligent device making a fault judgment on the received touch information.

Furthermore, the display screen is an LCD1602 display screen. That is, the display screen of the apparatus for testing a touch screen is a display screen with a low cost, a small size and a low resolution.

Furthermore, the processor is a microcontroller unit or an STM32 ARM processor. That is, the processor of the apparatus for testing a touch screen is a simple processor with low power consumption and a low cost.

Furthermore, the external communication interface unit comprises a Bluetooth transmitter and/or an RS232 interface. In addition, the external communication interface unit may also be another type of interface unit, for example, a WiFi transceiver unit, an infrared transceiver unit or the like, as long as it can achieve an external communication function.

Furthermore, the test signal collection interface unit comprises an Inter-Integrated Circuit (IIC) interface, and the processor is configured to generate an IIC timing, output the IIC timing to a touch chip of the touch screen through the test signal collection interface unit, and collect touch information detected by the touch chip through the test signal collection interface unit; and/or the test signal collection interface unit comprises a Serial Peripheral Interface (SPI), and the processor is configured to generate an SPI timing, output the SPI timing to the touch chip of the touch screen through the test signal collection interface unit, and collect touch information detected by the touch chip through the test signal collection interface unit.

Furthermore, the touch information comprises coordinate information of a touch point.

Furthermore, the processor is further configured to receive configuration parameters of the touch screen transmitted by the intelligent device through the external communication interface unit, and transmit the configuration parameters of the touch screen to the touch screen through the test signal collection interface unit to configure parameters of the touch screen.

According to another aspect of the present disclosure, the present disclosure provides an apparatus for controlling test of a touch screen, comprising:
a communication module configured to invoke an external communication interface unit of an intelligent device to receive touch information in a format recognizable by the intelligent device;

a processing module configured to invoke a processor of the intelligent device to process the touch information received by the communication module to obtain corresponding image data; and a display module configured to invoke a display screen of the intelligent device to display the image data obtained by the processing module.

Furthermore, the processing module is further configured to invoke the processor of the intelligent device to process the received touch information to obtain a trajectory of touch points on the tested touch screen; and the display module is further configured to invoke the display screen of the intelligent device to display the trajectory obtained by the processing module.

Furthermore, the apparatus for controlling test of a touch screen further comprises: a storage module configured to store a correspondence relationship between types of the touch screens and touch paths in the memory of the intelligent device; wherein, the display module is further configured to invoke the display screen of the intelligent device to display a first button for setting a path, invoke the display screen of the intelligent device to display a list of types of touch screens when it is detected by a touch detection circuit of the intelligent device that a user touches the first button, and after a type of a touch screen selected by the user is determined by the touch detection circuit of the intelligent device, invoke the display screen of the intelligent device to display a touch path corresponding to the type of the touch screen selected by the user.

Furthermore, the display module is further configured to invoke the display screen of the intelligent device to display the trajectory obtained by the processing module in a color different from that of the touch path in a position of the touch path displayed by the display screen of the intelligent device.

Furthermore, the display module is further configured to invoke the display screen of the intelligent device to display a second button for setting a direction, invoke the display screen of the intelligent device to display a list of directions of touch screens when it is detected by a touch detection circuit of the intelligent device that a user touches the second button, obtain a direction selected by a user through the touch detection circuit of the intelligent device, determine a placement direction of the touch screen according to the trajectory obtained by the processing module, and after a type of the touch screen selected by the user is determined by the touch detection circuit of the intelligent device, invoke the touch screen of the intelligent device to display a touch path corresponding to the type of the touch screen selected by the user according to the determined placement direction of the touch screen.

Furthermore, the processing module is further configured to cause the processor of the intelligent device to judge whether a corresponding touch screen has a touch defect according to the selected touch path and the obtained trajectory, generate touch defect information according to a judgment result, and transmit the touch defect information through the external communication interface unit of the intelligent device.

Furthermore, the display module is further configured to invoke the display screen of the intelligent device to display a third button for configuring parameters of the touch screen, invoke the display screen of the intelligent device to display a parameter configuration window when it is detected by the touch detection circuit of the intelligent device that a user touches the third button, and obtain configuration parameters of the touch screen input through the parameter configuration window; and the communication module is further configured to invoke the external communication interface unit of the intelligent device to transmit the configuration parameters of the touch screen obtained by the display module.

According to a third aspect, the present disclosure further provides a system for testing a touch screen, comprising any apparatus for testing a touch screen described above and any apparatus for controlling test of a touch screen described above.

In the apparatus for testing a touch screen according to the present disclosure, the processor converts the collected touch information into a format recognizable by the intelligent device and transmits the converted touch information to the intelligent device, to enable the touch information to be correspondingly processed and displayed by a processor and a display of the intelligent device respectively. In this way, as the processor of the apparatus for testing a touch screen per se needs not to perform corresponding data processing and analysis processes, a processor with low performance may be used to facilitate reducing the manufacturing cost of the apparatus for testing a touch screen.

DETAILED DESCRIPTION

In order to make the purpose, technical solutions, and advantages of the embodiments of the present disclosure more clearly, the technical solutions in the embodiments of the present disclosure will be clearly and completely described below with reference to the drawings of the embodiments of the present disclosure. Obviously, the embodiments as described are merely a part of embodiments of the present disclosure instead of all the embodiments. All other embodiments obtained by those skilled persons in the art without contributing any creative labor should belong to the scope protected by the present disclosure.

Figure 1:
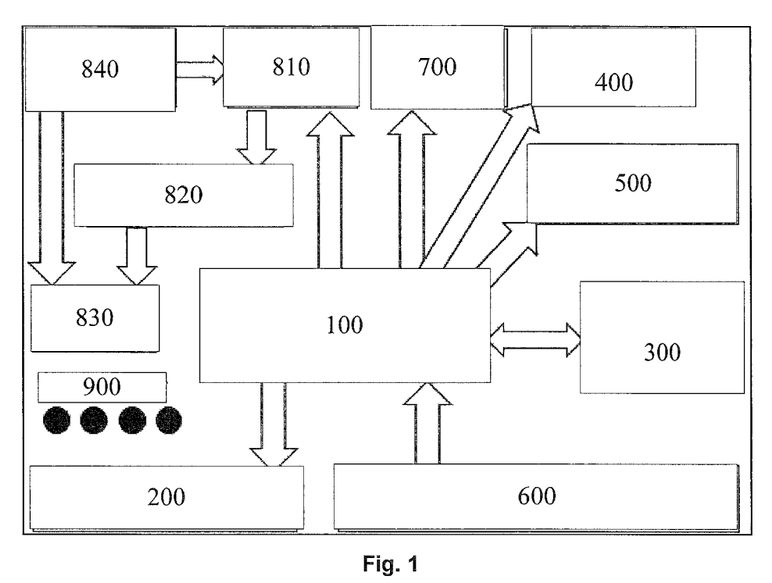
FIG. 1 is a structural diagram of an apparatus for testing a touch screen according to the present disclosure.

According to an aspect of the present disclosure, an apparatus for testing a touch screen is provided. As shown in FIG. 1, the apparatus for testing a touch screen comprises a processor 100, a test signal collection interface unit 200, an external communication interface unit, an LCD1602 display screen 500, and a control key 600. The external communication interface unit may be comprised of a Bluetooth transmitter 300 and a RS232 interface 400. Alternatively, the external communication interface unit may also be in another form, for example, a RF transceiver, a WiFi transceiver or the like. The apparatus for testing a touch screen further comprises a memory 700, and a power supply module. The power supply module is comprised of a charging circuit 810, a lithium battery 820, a power module 830, and a power input interface 840. The external communication interface unit, the LCD1602 display screen 500, the control key 600, the memory 700 and the power supply module each are connected to the processor 100. The memory 700 here is configured to receive and store attribute parameters corresponding to different types of touch screens. The processor 100 is connected to the memory 700 to collect touch information of a touch screen according to attribute parameters of the corresponding type of touch screen stored in the memory 700, and transmit the collected touch information to an intelligent device through the Bluetooth transmitter 300 or the RS232 interface 400.

In the apparatus for testing a touch screen according to the present disclosure, the processor converts the collected touch information into a format recognizable by the intelligent device and transmits the converted touch information to the intelligent device through the external communication interface unit (for example, the Bluetooth transmitter 300 or the RS232 interface 400), to enable the touch information to be correspondingly processed and displayed by a processor and a display of the intelligent device respectively. In this way, as the processor of the apparatus for testing a touch screen per se needs not to perform corresponding data processing and analysis processes, a processor with low performance may be used to facilitate reducing the manufacturing cost of the apparatus for testing a touch screen.

In addition, in practical applications, different types of touch screens may have different touch chips. Correspondingly, rules for encoding touch information such as touch coordinate information or the like may also be different. In the embodiment of the present disclosure, attribute parameters corresponding to different types of touch screens may be pre-stored in the memory 700, and the processor 100 collects touch information of a touch screen according to attribute parameters of the corresponding type of touch screen stored in the memory 700, so as to achieve collection of touch information of different types of touch screens. Of course, in practical applications, in a case that the memory described above is not arranged, the processor 100 may be configured to collect touch information of a fixed type of touch screen in a fixed collection mode, and the corresponding technical solution can also achieve the basic purpose of the present disclosure, and correspondingly also fall into the protection scope of the present disclosure.

In a specific implementation, the memory 700 here may specifically be a readable and writable storage circuit, in which attribute parameters corresponding to different types of touch screens may be written. The memory 700 may also be a cassette of an SD card or an MMC card, which may be used to read the attribute parameters corresponding to different types of touch screens in the SD card or the MMC card inserted into the cassette.

In a specific implementation, the processor 100 may transmit the touch information to a mobile intelligent device such as a mobile phone or the like through the Bluetooth transmitter 300, or transmit the touch information through the RS232 interface to a computer device with a corresponding interface such as a computer or the like. In a specific implementation, the Bluetooth transmitter here may be a Bluetooth 4.0 transmitter.

It is easily understood that if the external communication interface unit merely comprises the Bluetooth transmitter or the RS232 interface, the solution according to the present disclosure can also be achieved. Alternatively, the external communication interface unit may also not comprise the Bluetooth transmitter and the RS232 interface, and instead, comprises another type of external communication module, for example, an infrared transmitter or the like. Alternatively, the external communication interface unit may also comprise another type of external communication module which can achieve external communication, in which case a specific form of the external communication interface unit does not influence the protection scope of the present disclosure.

In a specific implementation, the processor 100 may also be configured to receive touch defect information transmitted by the intelligent device through the external communication interface unit and display the touch defect information on the LCD1602 display screen. The touch defect information here refers to information obtained by the intelligent device according to the touch information, which is used to represent whether there is a defect in the tested touch screen and a type of the defect. The information may be represented by a code, and is finally displayed on the LCD1602 display screen. In this way, the processor 100 only needs to display the touch defect information obtained by the intelligent device after processing the touch information, without correspondingly processing the touch information. Thereby, under the premise of achieving a display function, the burden on the processor is reduced, thereby reducing the requirements for the performance of the processor.

It is easily understood that in a specific implementation, the LCD1602 display screen here is not necessarily required to be arranged in practice. After the processor 100 transmits the touch information to the intelligent device, the touch information may be displayed by the display of the intelligent device. In addition, the LCD1602 display screen may be used here to reduce the cost of the apparatus for testing a touch screen. Of course, for the purpose of reducing the requirements for the performance of the processor, the LCD1602 display screen may also be substituted for another type of display screen. As long as the procedures of processing and analyzing the touch information are not performed by the processor of the apparatus for testing a touch screen, the corresponding technical solutions can reduce the requirements for the performance of the processor.

In a specific implementation, the processor 100 here may be a Microcontroller Unit (MCU) or an STM32 ARM processor. These processors can satisfy basic functions such as format conversion and code display, and achieve a low cost, which is beneficial to reduce the cost of the apparatus for testing a touch screen.

In a specific implementation, the test signal collection interface unit here may comprise an Inter-Integrated Circuit (IIC) interface, and in this case, the processor is configured to generate an IIC timing, output the IIC timing to the touch chip of the touch screen through the test signal collection interface unit, and collect touch information detected by the touch chip through the test signal collection interface unit; and/or the test signal collection interface unit may comprise a Serial Peripheral Interface (SPI), and in this case, the processor is configured to generate an SPI timing, output the SPI timing to the touch chip of the touch screen through the test signal collection interface unit, and collect touch information detected by the touch chip through the test signal collection interface unit.

When the IIC interface is comprised, the apparatus for testing a touch screen may complete testing of a touch screen having an IIC type of touch chip, and correspondingly, when the SPI interface is comprised, the apparatus for testing a touch screen may complete testing of a touch screen having an SPI type of touch chip.

In practical applications, the test signal interface unit may further be integrated with other types of interfaces, such as a ground interface, a driving voltage interface, a terminal detection instruction interface or the like.

In a specific implementation, the power input interface 840 here may be a 12V direct current power input interface.

Of course, in a specific implementation, a specific type of the power input interface does not influence the protection scope of the present disclosure. Furthermore, in practical applications, it also needs not to arrange the power supply module in a manner described above. The apparatus for testing a touch screen here may also use an external power. In this case, a structure of the charging circuit and the lithium battery is not necessarily required to be arranged.

In a specific implementation, the control key 600 here may be configured to perform basic control of the apparatus for testing a touch screen, for example, power-on, power-off, or initialization. Alternatively, the control key 600 may achieve basic control of the intelligent device. For example, when the control key 600 is pressed down, the processor 100 may transmit an initialization instruction or a test initiation instruction or the like through the external communication interface unit. Furthermore, as shown in FIG. 1, the apparatus for testing a touch screen may further comprise an indicator light 900, and the processor 100 may further cause the indicator light to display a color corresponding to a respective defect according to the touch defect information received from the intelligent device, so that a user directly judges a type of the touch defect or the like according to the color.

In a specific implementation, the touch information here may specifically comprise coordinates of a touch position which can be detected by the touch chip of the touch screen. Specifically, if a touch screen has no corresponding defect, positions where all lineation operations are performed by a user on the touch screen may be detected, and the corresponding touch information comprises coordinate information of positions where all lineation operations are performed. If a touch screen has a touch defect, defects such as breakpoints or the like may occur in the touch position.

In a specific implementation, the processor 100 here may further be configured to receive configuration parameters of the touch screen transmitted by the intelligent device through the external communication interface unit, and transmit the configuration parameters of the touch screen to the touch screen through the test signal collection interface unit to configure parameters of the touch screen.

The process has advantages of being capable of completing test of a touch screen with different parameter configurations. Specifically, the configuration parameters of the touch screen here may comprise touch pressure configuration parameters, allowable error configuration parameters or the like. The touch pressure configuration parameters here are used to indicate a particular touch pressure. The touch chip of the touch screen determines a touch position where a touch pressure is greater than the particular touch pressure, generates corresponding touch information, and transmits the touch information to the processor of the apparatus for testing a touch screen. The corresponding allowable error configuration parameters are used to indicate an allowable error. The touch chip of the touch screen screens out touch coordinates according to the allowable error, and generates corresponding touch information.

In another aspect, the present disclosure further provides an apparatus for controlling test of a touch screen, comprising:

a communication module configured to invoke an external communication interface unit of an intelligent device to receive touch information in a format recognizable by the intelligent device;

a processing module configured to invoke a processor of the intelligent device to process the touch information received by the communication module to obtain corresponding image data; and a display module configured to invoke a display screen of the intelligent device to display the image data obtained by the processing module.

In a specific implementation, the apparatus for controlling test of a touch screen here may be installed in an intelligent device such as a mobile phone or the like in a software form, and complete a corresponding test process by invoking hardware apparatuses of the intelligent device and cooperating with the apparatus for testing a touch screen described above.

In a specific implementation, the processing module is further configured to invoke the processor of the intelligent device to process the received touch information to obtain a trajectory of touch points on the tested touch screen; and the display module is further configured to invoke the display screen of the intelligent device to display the trajectory obtained by the processing module.

As positions of the touch points are displayed on the intelligent device, a user may determine whether a corresponding intelligent device has a touch defect by observing whether the trajectory of the touch points displayed on the intelligent device has a breakpoint.

In a specific implementation, the apparatus for controlling test of a touch screen may further comprise:

a storage module configured to store a correspondence relationship between types of the touch screens and touch paths in the memory of the intelligent device; and the display module is further configured to invoke the display screen of the intelligent device to display a first button for setting a path, invoke the display screen of the intelligent device to display a list of types of touch screens when it is detected by a touch detection circuit of the intelligent device that a user touches the first button, and after a type of a touch screen selected by the user is determined by the touch detection circuit of the intelligent device, invoke the display screen of the intelligent device to display a touch path corresponding to the type of the touch screen selected by the user.

In a specific implementation, positions where defects may easily occur may be different for different types of touch screens. For example, for some touch screens, a defect may easily occur in a central position, and for some other touch screens, a defect may easily occur in an edge position. In this case, during a test, it only needs to primarily perform a test in these positions where defects easily occurs. The apparatus for controlling test of a touch screen according to the present disclosure pre-stores touch paths in which defects easily occur corresponding to various touch types, and allows a user to select a corresponding touch path according to a touch type of the touch screen, thereby achieving higher efficiency and accuracy of the test.

Figure 2:
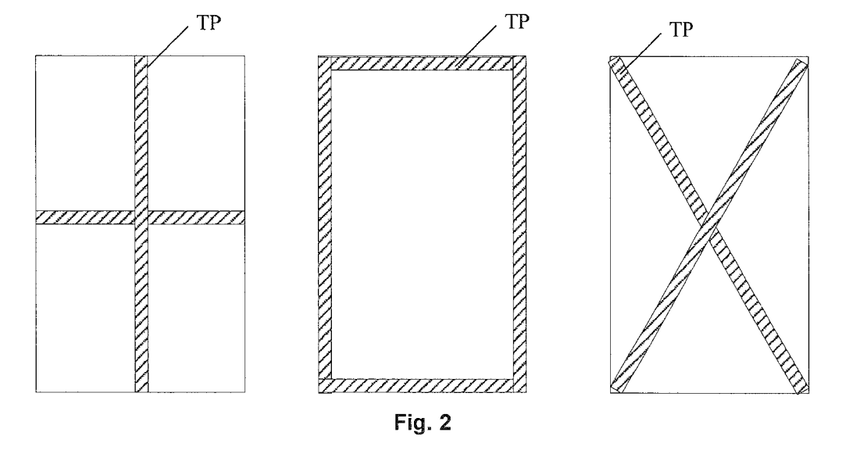
FIG. 2 is a diagram of possible touch paths corresponding to different types of touch screens.

As shown in FIG. 2, Touch Paths (TPs) in which defects may easily occur corresponding to three different types of touch screens are presented.

Furthermore, the display module is further configured to invoke the display screen of the intelligent device to display the trajectory obtained by the processing module in a color different from that of the touch path in a position of the touch path displayed by the display screen of the intelligent device.

Thereby, in an aspect, a reference is provided for a position where a lineation operation is performed by a user, thereby achieving a more accurate position where a lineation operation is performed by the user. In another aspect, as different colors are used, a degree of distinction can be improved, thereby facilitating user recognition.

In a specific implementation, the touch path and the actual touch trajectory here may be displayed in a particular region of the display screen.

Furthermore, the display module may further be configured to invoke the display screen of the intelligent device to display a second button for setting a direction, invoke the display screen of the intelligent device to display a list of directions of touch screens when it is detected by a touch detection circuit of the intelligent device that a user touches the second button, obtain a direction selected by a user through the touch detection circuit of the intelligent device, determine a placement direction of the touch screen according to the trajectory obtained by the processing module, and after a type of the touch screen selected by the user is determined by the touch detection circuit of the intelligent device, invoke the touch screen of the intelligent device to display a touch path corresponding to the type of the touch screen selected by the user according to the determined placement direction of the touch screen.

In this way, automatic calibration of the placement direction of the touch screen can be achieved, thereby enabling the user to place the tested touch screen without strictly following a certain direction. For example, after a user completes placing the touch screen, a lineation operation is performed in a direction parallel to a length of the touch screen towards the right of the screen, and a second button is touched to select a right direction as a current direction. In this way, the display module can determine the placement direction of the touch screen according to the touch information, so as to display the touch path corresponding to the touch screen on the display apparatus of the intelligent device in a correct direction.

Furthermore, the display module is further configured to invoke the display screen of the intelligent device to display a third button for configuring parameters of the touch screen, invoke the display screen of the intelligent device to display a parameter configuration window when it is detected by the touch detection circuit of the intelligent device that a user touches the third button, and obtain configuration parameters of the touch screen input through the parameter configuration window; and the communication module is further configured to invoke the external communication interface unit of the intelligent device to transmit the configuration parameters of the touch screen obtained by the display module.

In this way, after the configuration parameters of the touch screen are transmitted to the apparatus for testing a touch screen, the apparatus for testing a touch screen correspondingly configures parameters of the tested touch screen, so as to achieve a lineation test with a corresponding parameter configuration.

Specifically, the parameters of the touch screen here may be used to set touch sensitivity, i.e., setting a degree of sensitivity for the touch screen, for example, touch parameters of the touch screen such as a touch pressure, an allowable error or the like. In this way, the touch information obtained by the touch chip of the touch screen is touch information in a corresponding touch pressure or allowable error condition, so as to achieve test of a touch screen with different configuration parameters.

In a specific implementation, the display module may further be configured to invoke the display screen of the intelligent device to display a window for counting measured products, a fourth button for setting whether to display real-time coordinates of lineation and a fifth button for setting whether to display a number of points of multi-point lineation. In a specific implementation, when the fourth button is pressed down by a user, the display module may further invoke the display screen to display coordinates of the current touch position. When the fifth button is pressed down by the user, multiple touch trajectories may be displayed in different colors.

Figure 3:
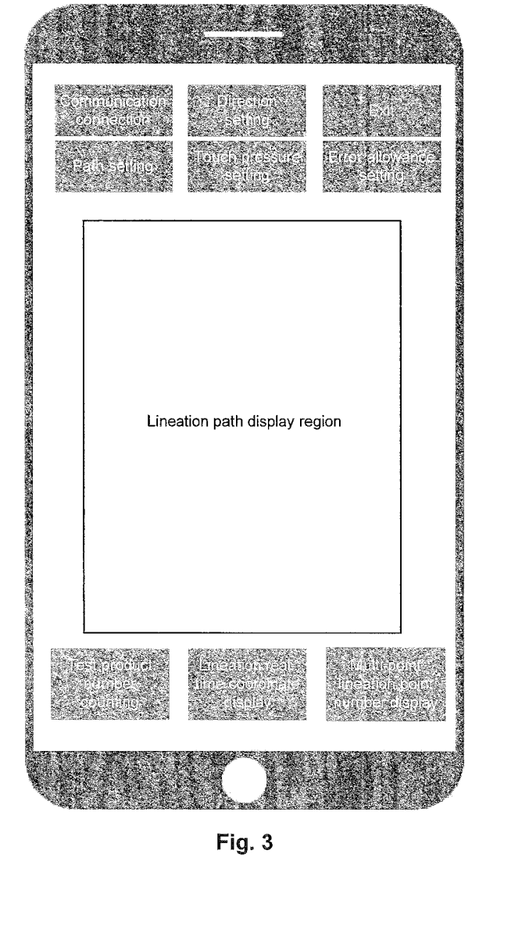
FIG. 3 is a diagram of a possible interface displayed by an apparatus for controlling test of a touch screen on an intelligent device according to the present disclosure.

As shown in FIG. 3, illustrated is a diagram of a possible interface displayed by the apparatus for controlling test of a touch screen according to the present disclosure on the intelligent device, which comprises a communication connection button, a direction setting button, an exit button, a path setting button, a touch pressure setting button, an error allowance setting button, a test product number counting window, a lineation real-time coordinate display button, and a multi-point lineation point number display button, and has a lineation path display region. The communication connection button here is used to establish a communication connection with the apparatus for testing a touch screen. The direction setting button here corresponds to the second button described above, the path setting button corresponds to the first button described above, the touch pressure setting button here and the error allowance setting button here correspond to the third button described above, the lineation real-time coordinate display button corresponds to the fourth button described above, and the multi-point lineation point number display button corresponds to the fifth button described above.

Furthermore, the processing module is further configured to cause the processor of the intelligent device to judge whether a corresponding touch screen has a touch defect according to the selected touch path and the obtained trajectory, generate touch defect information according to a judgment result, and transmit the touch defect information through the external communication interface unit of the intelligent device.

The touch defect information here may be used to indicate whether a corresponding touch screen has a touch defect, and may also be used to indicate a type of the defect. In a specific implementation, the storage module may also be configured to invoke the memory of the intelligent device to store corresponding data for judging whether there is a touch defect (for example, rules for judging whether there is a defect), so that the processor of the intelligent device judges whether there is a touch defect according to the corresponding data.

Figure 4:
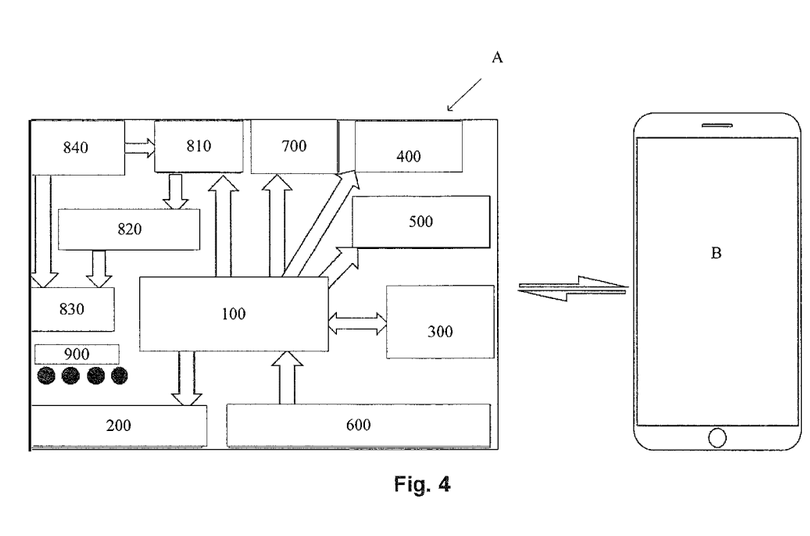
FIG. 4 is a diagram of a connection relationship between an apparatus for testing a touch screen and an intelligent device installed with an apparatus for controlling test of a touch screen.

In a third aspect, the present disclosure further provides a system for testing a touch screen, comprising the apparatus for testing a touch screen described in the first aspect and the apparatus for controlling test of a touch screen described in the second aspect. The apparatus for controlling test of a touch screen may be installed in a corresponding intelligent device in a software form. As shown in FIG. 4, illustrated is a diagram of a connection relationship between an apparatus for testing a touch screen and an intelligent device installed with an apparatus for controlling test of a touch screen during a test, wherein the apparatus for testing a touch screen A is connected to the intelligent mobile phone B through Bluetooth, and the intelligent mobile phone B is installed with the apparatus for controlling test of a touch screen described above in an APP form.

The process of using the system for testing a touch screen described above may comprise:

Firstly, the apparatus for controlling test of a touch screen is installed in the intelligent device, and a communication connection between the intelligent device and the apparatus for testing a touch screen is established (the communication connection is achieved through an external communication interface unit of the intelligent device and an external communication interface unit of the apparatus for testing a touch screen). After the connection is established, processes of parameter configuration, direction calibration, and touch path selection are completed using the third button, the second button and the first button of the intelligent device respectively. In this case, the apparatus for controlling test of a touch screen is indicated to start a test process by pressing on a control button of the apparatus for testing a touch screen, and then a lineation operation is performed on the touch screen. Touch information during the lineation operation is obtained by the apparatus for testing a touch screen and is uploaded to the intelligent device. The apparatus for controlling test of a touch screen invokes the processor of the intelligent device to perform a corresponding process and invokes the display screen of the intelligent device to display a lineation path (i.e., a trajectory of touch points). After the lineation operation is completed, the intelligent device automatically makes a judgment and displays a judgment result.

The above description is merely specific embodiments of the present disclosure. However, the protection scope of the present disclosure is not limited thereto.

Variations or substitutions which are easily reached by any skilled in the art within the technical scope of the present disclosure should be contained in the protection scope of the present disclosure. Therefore, the protection scope of the present disclosure should be defined by the protection scope of the claims.

We claim:

1. An apparatus for testing a touch screen, comprising: a processor, a display screen, a test signal collection interface unit, and an external communication interface unit, the processor being connected to the test signal collection interface unit and the external communication interface unit, wherein,
the test signal collection interface unit is configured to collect touch information of the tested touch screen, and
the processor is configured to convert the touch information collected by the test signal collection interface unit into a format which is recognizable by an intelligent device, and transmit the converted touch information to the intelligent device through the external communication interface unit,
the processor is further configured to receive touch defect information transmitted by the intelligent device through the external communication interface unit and display the touch defect information on the display screen, wherein the touch defect information is obtained by the intelligent device making a fault judgment on the received touch information.

2. The apparatus according to claim 1, further comprising:
a memory, configured to receive and store attribute parameters corresponding to different types of touch screens; wherein,
the processor is connected to the memory to collect touch information of a touch screen according to attribute parameters of the corresponding type of touch screen stored in the memory.

3. The apparatus according to claim 1, wherein the display screen is an LCD1602 display screen.

4. The apparatus according to claim 1, wherein the processor is a microcontroller unit or an STM32 ARM processor.

5. The apparatus according to claim 1, wherein the external communication interface unit comprises a Bluetooth transmitter and/or an RS232 interface.

6. The apparatus according to claim 1, wherein the test signal collection interface unit comprises an Inter-Integrated Circuit (IIC) interface, and the processor is configured to generate an IIC timing, output the IIC timing to a touch chip of the touch screen through the test signal collection interface unit, and collect touch information detected by the touch chip through the test signal collection interface unit; and/or
the test signal collection interface unit comprises a Serial Peripheral Interface (SPI), and the processor is configured to generate an SPI timing, output the SPI timing to the touch chip of the touch screen through the test signal collection interface unit, and collect touch information detected by the touch chip through the test signal collection interface unit.

7. The apparatus according to claim 1, wherein the touch information comprises coordinate information of a touch point.

8. The apparatus according to claim 1, wherein the processor is further configured to receive configuration parameters of the touch screen transmitted by the intelligent device through the external communication interface unit, and transmit the configuration parameters of the touch screen to the touch screen through the test signal collection interface unit to configure parameters of the touch screen.

9. The apparatus according to claim 1, wherein the intelligent device is an intelligent device external to the tested touch screen or an intelligent device to which the tested touch screen belongs.

* * * * *